Figure 1:
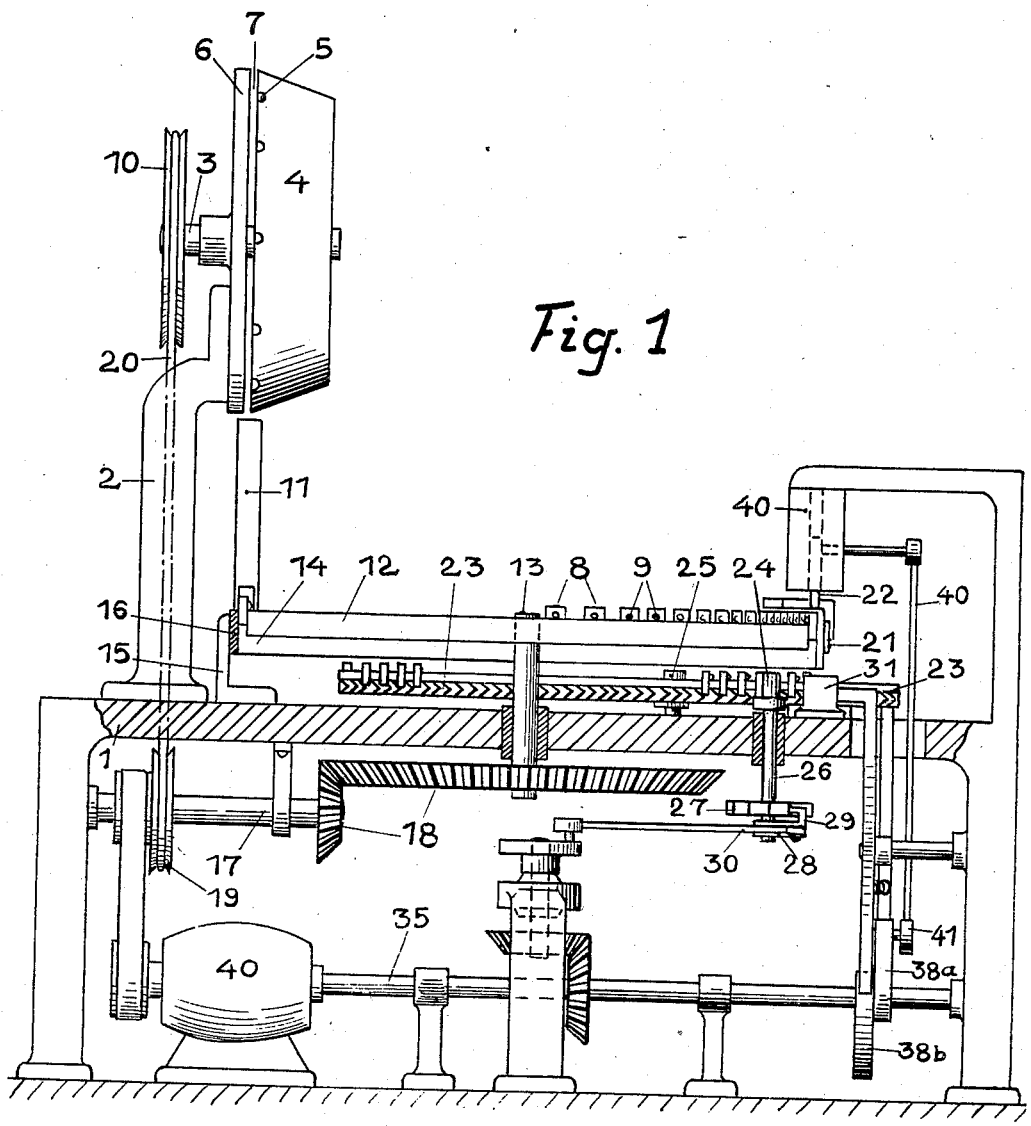

April 29, 1941.  J. PÜSCHNER ET AL  2,240,018
DEVICE FOR PRODUCING SLIDING CLASP FASTENERS
Filed Feb. 14, 1939  2 Sheets-Sheet 1

Inventors,
J. Püschner &
J. Püschner
By Glascock Downing & Seebold

Inventors,
J. Püschner &
J. Püschner

Patented Apr. 29, 1941

2,240,018

UNITED STATES PATENT OFFICE 2,240,018

DEVICE FOR PRODUCING SLIDING CLASP FASTENERS

Julius Püschner and Josef Püschner, Bodenbach, Germany

Application February 14, 1939, Serial No. 256,400
In Czechoslovakia February 17, 1938

6 Claims. (Cl. 153—1)

This invention relates to devices for the production of sliding clasp fasteners of the kind, in which the supply of fastener members to be dealt with is not regularly arranged in a container. In these known devices the supply container as a rule has the form of a drum rotating about a substantially horizontal axis and is provided at the periphery with openings, through which the fastener members can leave the supply container singly arranged in a definite manner. The fastener members as they fall singly out of the supply container pass into a chute, in which they pile up and are conveyed to the place where they are to be further operated on. As the feed of fastener members by the supply container does not take place uniformly, but the placing in position and clamping on the tape proceeds in a uniform manner, this chute must be relatively long, in order that there shall be a sufficient supply of fastener members in the chute for effecting an equalisation. The chute is so formed that the fastener members, when sliding down, will be properly guided in it. This, however, causes a relatively great amount of friction of the members in the chute, so that in the conveyance of the fastener members in the chute jamming frequently occurs. For this reason knocking devices are provided, which strike against the chute in such a manner that the fastener members can overcome the jamming. The knocking devices cause a disturbing noise, however.

The invention relates to such an arrangement of the said devices for the production of sliding clasp fasteners that the knocking device can be dispensed with. The novelty consists in this, that the fastener members are transferred from the supply container by way of a quite short guiding piece into a substantially horizontally disposed channel, the side walls of which are formed on one side by a stationary ring and on the other side by the periphery of a rotary disc which is disposed within the ring and on the rim of which the fastener members suspend themselves with their coupling projections and the stationary wall of which ring is made resilient at one place, such that an upwardly and downwardly movable pressure applying finger can press the fastener member arriving under it in the gap downwards on to the sliding clasp fastener tape below it. Shortly before this place the channel is covered by a guide rail which forces the fastener members downwards, so that they can no longer be forced upwards out of the channel by the pressure of the following fastener members conveyed by the rotating disc. When the channel is fed with too many fastener members, the excess is forced out of the channel at the beginning end of the covering rail and caught in a container arranged below. The forcing out of the excess of fastener members is effected mechanically by the pressure of the conveyed fastener members themselves, which, as long as the legs are spread apart, have inclined side edges, so that the forcing out of the superfluous fastener members takes place, if even through the wedging effect alone.

Figure 2:
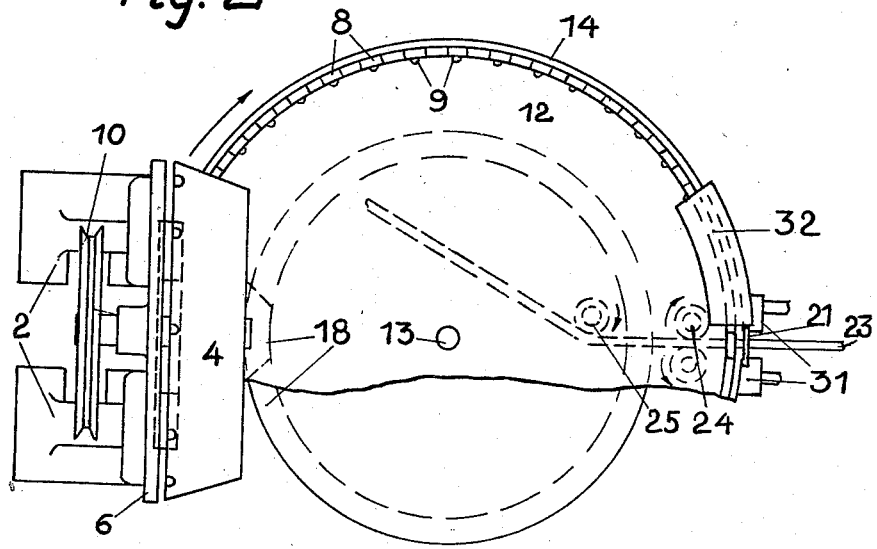
Figure 3:
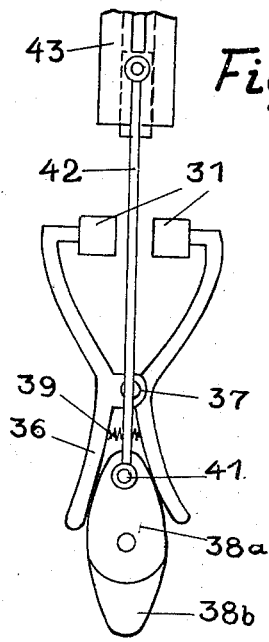

The arrangement according to the invention is illustrated by a constructional example in the accompanying drawings, in which Fig. 1 is a side elevation, partly in section, Fig. 2 a plan view and Fig. 3 a plan view of the drive of the press plungers and the pressure applying finger.

Figure 4:
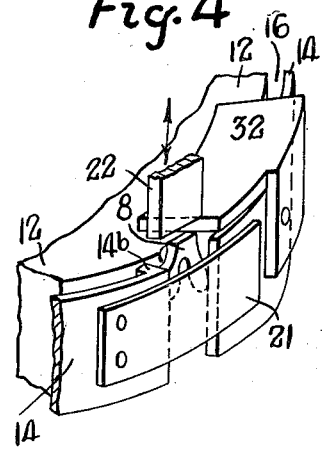

Fig. 4 is an enlarged fragmentary perspective detailed view showing particularly the disc member and stationary ring having the opening and adjacent parts.

I is the work table supported by feet. On it is fixed a standard 2 which supports a supply drum 4 capable of turning on a horizontal shaft 3. The drum has the usual form of a hollow truncated cone and is provided at the broader base surface with marginal openings 5 in the conical wall. The broader base surface of the supply drum 4 faces a stationary plate 6, a gap 7 being however left between the two, the width of which corresponds to the thickness of a member 8. The openings 5 at one edge of the supply drum 4 correspond in size and shape to the cross-section of a coupling projection 9 of the fastener members. In the supply container 4 the fastener members to be operated on lie in an unordered heap. When the supply drum 4 is rotated by a rope pulley 10 provided on the shaft 3, the fastener members contained in the supply drum 4 are shaken about, so that they will be caused continuously to occupy a different position. At the same time individual fastener members will come into such a position that they can pass through the gap 7 and one of the openings 5 at the rim of the supply drum 4 out of the latter. The fastener members leaving the supply container 4 pass into a vertically disposed short guide chute 11 which is preferably made funnel-shaped at the end facing the supply drum 4, so as to be capable of correctly catching the fastener members as they leave the supply drum 4 and fall down. The relatively short guiding piece 11 is substantially so shaped that the fastener members will be offered as little friction as possible in it, but that they cannot change the position in which they are when falling out of the supply drum 4.

Above the table 1 and parallel to it is arranged a disc 12 which is rotatably supported in the table 1 with a vertical shaft 13. Around the disc 12 is disposed a concentric ring 14 which is carried by holders 15. Between the periphery of the disc 12 and the ring 14 an annular channel 16 is left, the width of which corresponds to the full thickness of a fastener member 8. The disc 12 is so arranged on the table 1 that the shaft 13 lies in a vertical plane laid through the driving shaft 3 for the supply drum 4 and that the plane determined by the gap 7 at the supply drum 4 is tangential to the annular channel 16 between the rotary disc 12 and the stationary ring 14, the disc 12 being as regards the standard 2 on the same side as the supply drum 4. The fastener members falling out of the supply drum 4 pass through the short guide piece 11 directly into the annular channel 16 and suspend themselves with their coupling projections 9 from the rim of the disc 12, being secured from falling down from the disc 12 by the guide ring 14. The fastener members hanging by their coupling projection 9 rock automatically into such a position that the legs of the fastener members will hang downwards, if the fastener members do not already leave the guide piece 11 in this position. As the disc 12 rotates the fastener members 8 hanging on it are carried along by the disc and, guided by the ring 14, are moved forwards into the annular channel 16. The disc 12 is driven from the shaft 17 by way of bevel gearing 18. The shaft 17 also carries a rope pulley 19, from which a rope 20 drives the rope pulley 10 of the drum 4.

At the side opposite the standard 2 the ring 14 is interrupted and the opening thus produced is covered by a spring 21. At this place or operating station the usual spring-loaded plunger 22 is also arranged to move up and down under the spring action. This plunger is so shaped and arranged that it can enter the annular channel 16 and will in each case only strike against one fastener member which has been conveyed by the disc 12 during its rotary motion to this place up to a stop provided there. As the coupling projections 9 of the fastener members are of slightly conical shape and the spring 21 yields, that member, which the plunger 22 strikes during its downward motion will be forced downwards into the annular channel 16 and pushed through it. The member will thus be brought with its spread legs astride the fastener tape 23 which is conveyed along intermittently standing on edge between the disc 12 and the plate 1. The tape 23 is conveyed along by intermittently moved rollers 24 and is guided over guide rollers 25. The conveying rollers 24 and the guide rollers 25 are mounted on pins in the table 1. The pin of one conveying roller 24 is arranged so as to be transversely displaceable in the table in such a manner that this roller is always drawn by a spring (not shown) towards the other conveying roller 24 and the fastener tape 23 is clamped between them. The other conveying roller 24 is fixed on a pin 26 which projects somewhat beyond the under side of the table plate 1. Rigidly fixed on this pin 26 is a ratchet wheel 27 and loosely rotatable on it is an arm 28 which is provided with a pawl 29 for engagement in the ratchet wheel 27. By gearing arranged below the table 1 and driven from the main shaft 35 the arm 28 is moved to and fro several times during each revolution of the disc 12 by means of a push bar 30, so that during each revolution of the disc 12 the tape 23 will also be advanced several times intermittently. The push bar 30 preferably engages a crank disc of the intermediate gear, the crank pin of which is adjustable, as is also the length of the push bar 30, so that the amount of forward feed of the fastener tape 23 can be changed according to the conditions or according to the desired spacing of the fastener members on the tape.

31 are the pressure applying jaws which are arranged parallel to the table 1 and perpendicularly to the tape 23 and between which the tape 23 passes and which are disposed below the plunger 22. During the upward motion of the plunger 22 these pressure applying jaws 31 are moved towards one another and firmly press the legs astride the tape 23 of the fastener member which has just been placed in position on to the tape.

The pressure applying jaws 31 which are moveable in guides of the table 1 are moved by levers 36 which are arranged to rock about a common pin 37. The levers 36 bear each with its lower end against a cam disc 38a, 38b, against the periphery of which they are drawn by a spring 39. The two cams 38a, 38b are mounted on the main shaft 35 which is driven by an electric motor 40. On one cam, 38a, a crank pin 41 is provided, which is connected by a connecting rod 42 with the plunger 22 which slides in a guide 43.

In the conveying arrangement according to the invention any jamming of the fastener members on their way from the supply drum to the place where they are to be operated on is not to be feared, as in the short guide piece 11 they have plenty of room for free movement and they are carried along in the annular channel 16 by the rotary motion of the disc 12. With a suitably rapid rotary motion of the supply drum 4 there will always be a sufficient supply of fastener members in the annular channel 16, so that the plunger 22 can at each downward motion force one fastener member out of the annular channel 16 and press it on to the fastener tape 23. The speed of the disc is preferably so adjusted that there will be an excess of fastener members in the annular channel 16. As the fastener members, when being carried along by the disc 12 at the height of the spring 21, are arrested by a stop, the fastener members will, while they are moving in the annular channel 16, exert a certain pressure on one another, when they strike against one another. As, owing to their legs being spread, the fastener members have inclined side edges, a sort of wedging action is produced, when the fastener members are pressed against one another, by which the fastener members, when they accumulate, will be forced upwards out of the annular channel 16. This forcing upwards of the superfluous fastener members would interfere with the operation of the plunger 22, if this should occur in the vicinity of the plunger 22. For this reason there is provided shortly before the spring 21 or the plunger 22 a rail 32 which extends a certain distance and which covers the annular channel 16, but is at such a distance above the disc 12 and the ring 14 that the fastener members, when resting on the disc 12 with their coupling projections 9, can move freely below the rail 32. The wedging action mentioned gradually tends to raise certain of the members upwardly out of the channel 16. However due to the guide rail or cover 32 this forcing out of the fastener members is effected anterior to said rail and since the stop member 14b on the ring limits the forward movement of the fastener members in the channel, the continued rotation of the disc 12 will progressively advance the fastener members fed from the chute 11 to the guide rail and fill the gap occasioned by the above mentioned wedging action. The beginning end of the covering rail 32 is preferably curved slightly upwards, so that fastener members which have already been slightly forced out of the annular channel 16 during their motion towards the covering rail 32 are forced down. The forcing out of the superfluous fastener members takes place before the covering rail, where it cannot interfere with the operation of the machine. The fastener members which have been forced out of the annular channel 16 fall into a container placed below.

What we claim is:

1. A device for producing sliding clasp fasteners wherein a series of fastener members are fixed on a tape, comprising in combination a supply drum for an inordinate supply of fastener members having coupling projections, means for effecting the delivery of each fastener member from said drum in a predetermined position, a horizontal disc rotatable about a vertical axis, a stationary guide ring concentrically surrounding said disc and spaced a predetermined distance from the latter to form a channel for receiving said fastener members delivered from said supply receptacle, an operating station arranged adjacent the ring, said channel extending from said drum to said operating station, the coupling projections of said fastener members resting on the rim of the rotatable disc and suspended in the channel and prevented from falling by said ring, and means for rotating said disc for progressively advancing said fastener members in said channel toward said operating station.

2. A device as claimed in claim 1 including a stop member in said channel adjacent said operating station for limiting the forward movement of said fastener members.

3. A device as claimed in claim 1 including a stop member in said channel adjacent said operating station for limiting the forward movement of said fastener members, and a rail member adjacent said stop member extending rearwardly for a predetermined distance, said rail member lying over said channel and being spaced a predetermined distance above the latter for preventing the upward displacement of said fastener members.

4. A device for producing sliding clasp fasteners wherein a series of fastener members are fixed on a tape, comprising in combination a supply drum for an inordinate supply of fastener members having coupling projections, means for effecting the delivery of each fastener member from said drum in a predetermined position, a horizontal disc rotatable about a vertical axis, a stationary guide ring concentrically surrounding said disc and spaced a predetermined distance from the latter to form a channel for receiving said fastener members delivered from said supply receptacle, an operating station arranged adjacent the ring and approximately opposite the drum, said channel extending from said drum to said operating station, the coupling projections of said fastener members resting on the rim of the disc and suspended in the channel and prevented from falling by said ring, means for rotating said disc for progressively advancing said fastener members in said channel toward said operating station, stop means in said channel for limiting the forward movement of said members, said stationary ring being provided with an opening adjacent said stop means, resilient means forming a resilient wall at one side of said opening, a plunger adapted to reciprocate into and out of said channel adjacent said opening, and means for intermittently reciprocating said plunger for successively forcing said fastener members out of said channel onto the fastener tape adjacent said operating station.

5. A device as claimed in claim 4 including a rail member adjacent said stop means, extending rearwardly for a predetermined distance, said rail member lying over said channel and being spaced a predetermined distance above the latter, to prevent the upward displacement of said fastener members.

6. A device as claimed in claim 4 wherein said stop means comprises a leaf spring secured to said ring, said spring being yieldable in a radial direction.

JULIUS PÜSCHNER.
JOSEF PÜSCHNER.